(No Model.)
W. G. WAGENHALS.
TROLLEY BASE CUSHION.
No. 596,193.   Patented Dec. 28, 1897.
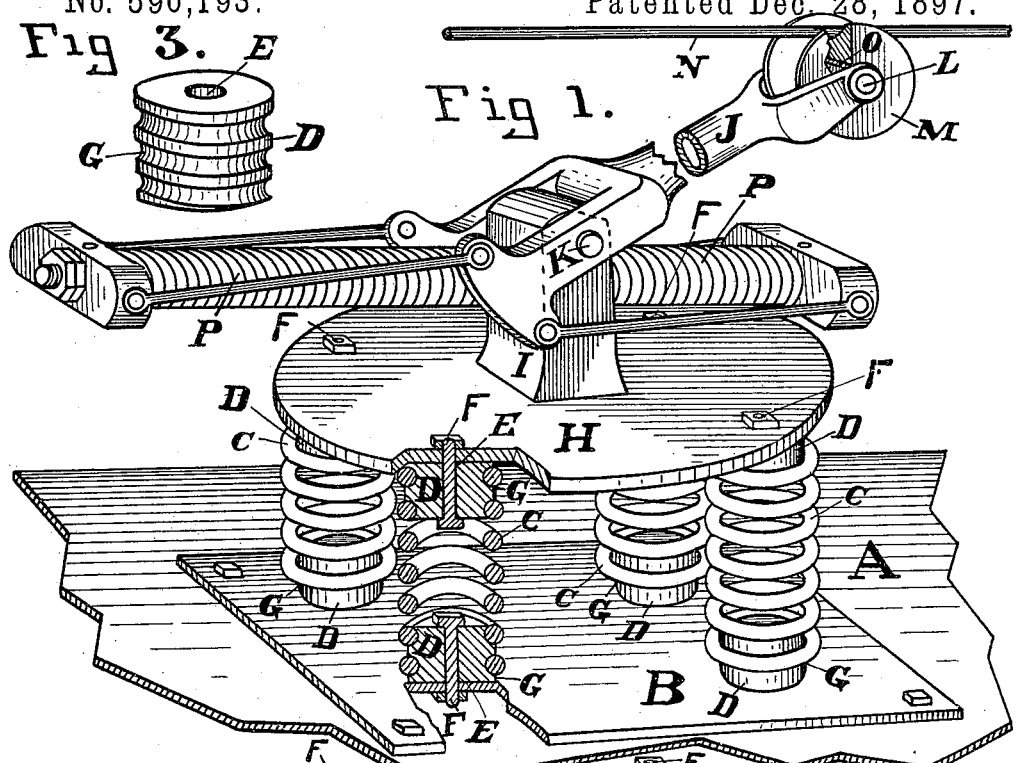
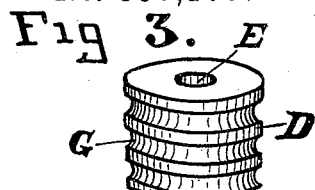
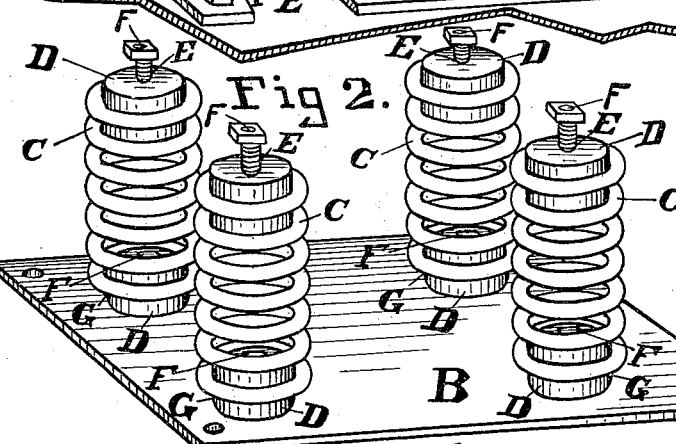
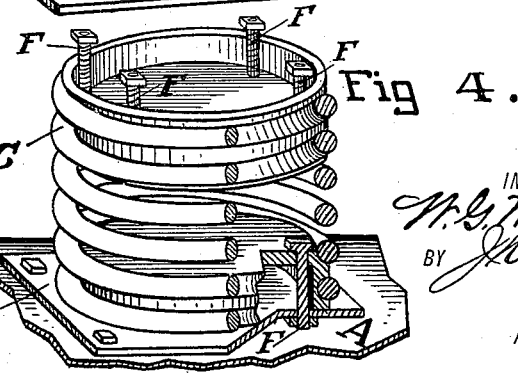
WITNESSES
E. B. Lehman
N. L. Silvey
INVENTOR
W. G. Wagenhals
BY J. Kirby Jr
ATTORNEY.
THE NORRIS PETERS CO., PHOTO-LITHO., WASHINGTON, D. C.

UNITED STATES PATENT OFFICE.

WILLIAM G. WAGENHALS, OF DAYTON, OHIO, ASSIGNOR TO THE DAYTON MANUFACTURING COMPANY, OF SAME PLACE.

TROLLEY-BASE CUSHION.

SPECIFICATION forming part of Letters Patent No. 596,193, dated December 28, 1897.

Application filed July 23, 1897. Serial No. 645,732. (No model.)

*To all whom it may concern:*

Be it known that I, WILLIAM G. WAGENHALS, of Dayton, in the county of Montgomery and State of Ohio, have invented a new and useful Improvement in Trolley-Base Cushions, of which the following is a full, clear, and exact description.

The invention relates to a yielding support or cushion adapted to be secured to the roof of an electrically-propelled railway-car, or to a suitable support thereon, and to receive and support the base of the trolley through which electric current for propelling the car is conveyed from an overhead wire to the motor, which is usually located beneath the floor of the car.

The objects of the invention are, first, to contribute quiet and ease to the car by eliminating the vibration in the trolley due to the wheel which traverses the overhead wire passing over connecting-ears, to slightly-worn wheel-bushings, and to lost motion in other parts of the trolley, causing vibration of the pole, which is communicated to the base of the trolley and thence to the roof of the car, where it is intensified in proportion to the length thereof, and in long cars—such, for instance, as are usually operated on suburban and interurban railways—is quite noticeable and annoying to passengers; second, to reduce the tension on the trolley-wheel; third, to provide a more flexible motion to the trolley-base when rounding a curve; fourth, to so construct a trolley-base support as to avoid the necessity of pivoting the trolley to its base to permit the wheel to accommodate itself to the overhead wire, and, fifth, to provide means whereby wear on the trolley equipment will be lessened, its cost of maintenance reduced, and its life increased; and to these ends the invention consists in certain parts and details and in combinations of same, as will be hereinafter fully described and then pointed out in the claims.

Reference is to be had to the accompanying drawings, forming part of this specification, in which similar letters of reference indicate corresponding parts in all the views.

Figure 1 is a broken perspective view of the invention, having a trolley mounted thereon and showing an overhead wire and the trolley-wheel in position with relation thereto and in which one of the cushion-springs and its spirally-grooved bushings are shown in section. Fig. 2 is a detached perspective view of the invention. Fig. 3 is a perspective view of one of the spirally-grooved spring-bushings, and Fig. 4 is a perspective view showing a modification of the invention in which a single spring is employed.

A represents the roof of a car, to which a plate B is secured.

C represents two pairs of helical springs. A single spring, arranged as shown in Fig. 4, when properly proportioned and constructed may be made to serve the purpose of the invention; but from practical experiments made with the invention in actual service I am induced to prefer the use of four springs, arranged as shown in Figs. 1 and 2, and will therefore confine its description to such construction.

The springs C are connected at their lower ends with the plate B by means of spirally-grooved bushings D, each having a central bore E, through which and through corresponding holes in the plate B bolts F pass and by which the bushings D are bolted to the plate. The spiral grooves G of the bushings D correspond with the inner diameter of the coils of the springs, which are caused to engage said grooves by turning, screw-like, to place, the upper ends of said springs being provided with similar bushings and bolts for connection with the base H of the trolley I, as clearly shown in Figs. 1 and 2. A pole J, having its ends bifurcated, is pivoted at K to the trolley I, and at its opposite end is journaled at L a grooved wheel M, which traverses the under side of a trolley-wire N, suspended a suitable distance above the car. The wheel M is provided with an antifriction bushing or bearing O and is held in contact with the trolley-wire by springs P in the usual manner.

Electric current is conveyed from the trolley-wire by means of the trolley-wheel when in contact with the said wire, thence through the trolley-pole to the trolley and its base, thence through the springs C and their supporting-base B to wires connecting the same with the motor under the car.

As the trolley and its appurtenances form no part of my invention, which is applicable to any of the types in common use, I will not further describe the details thereof, which, together with the manner in which electric current is conveyed to the motor and the car propelled, are well understood by those familiar with the art to which my invention belongs.

Among the many perplexing difficulties in connection with electric-car equipment may be mentioned the trolley and its appurtenances, the chief cause of which is attributable to the manner of connecting the trolley-base to the roof of the car, and considerable effort has been bestowed in trying to reduce the excessive wear on the various parts, to avoid the pounding noise caused by irregularities in the equipment, and to provide a more flexible and yet practical and efficient means of connecting the trolley with the roof of the car, whereby it will respond quickly to all irregularities in the trolley-wire and more readily yield to curves in the same; and although I have had much experience in the art I have not found or known of a device which so successfully accomplishes the desired results as does the invention which I now seek to protect by Letters Patent of the United States.

By mounting the trolley-base in the manner herein described and shown an elastic or yielding support is provided, by which the difficulties mentioned are reduced to a minimum and the cost of maintenance also reduced.

Having thus fully described my invention, I claim—

1. In an electrically-propelled railway-car, an elastic or yielding cushion consisting of a base-plate, secured to the roof of said car; two pairs of helical springs mounted on said base-plate; and means for securing said springs to said base-plate, in combination with a trolley having a base mounted on and above said springs, substantially as described and for the purpose set forth.

2. In a trolley-base cushion, the base-plate B, the two pairs of helical springs C, the spirally-grooved spring-bushings D, and the bolts F, in combination with a trolley-base mounted on and above said springs, substantially as described and for the purpose set forth.

In testimony whereof I have hereunto subscribed my name this 21st day of July, 1897.

W. G. WAGENHALS.

Witnesses:
D. L. COWAN,
EUGENE SHINN.